United States Patent
Su et al.

(10) Patent No.: US 7,711,108 B2
(45) Date of Patent: May 4, 2010

(54) FAST ECHO CANCELLER RECONVERGENCE AFTER TDM SLIPS AND ECHO LEVEL CHANGES

(75) Inventors: Huan-Yu Su, San Clemente, CA (US); Adil Benyassine, Irvine, CA (US); Nick J. Lavrov, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1462 days.

(21) Appl. No.: 11/072,476

(22) Filed: Mar. 3, 2005

(65) Prior Publication Data

US 2006/0198511 A1 Sep. 7, 2006

(51) Int. Cl.
    *H04M 9/08* (2006.01)
(52) U.S. Cl. .................................. 379/406.08
(58) Field of Classification Search .............. 379/406.08
    See application file for complete search history.

(56) References Cited

U.S. PATENT DOCUMENTS 5,455,819 A * 10/1995 Sugiyama ................. 370/241
5,687,229 A    11/1997 Sih
5,875,246 A *  2/1999 Houghton ............... 379/406.05
6,064,733 A *  5/2000 Hayashi ................. 379/406.06
6,671,374 B1  12/2003 Nemri et al.
6,928,161 B1 *  8/2005 Graumann ............. 379/406.08

* cited by examiner

*Primary Examiner*—Alexander Jamal
(74) *Attorney, Agent, or Firm*—Farjami & Farjami LLP

(57) ABSTRACT

A method of adjusting an echo canceller comprises obtaining a first cross-correlation between a far-end signal and an error signal, wherein the error signal is generated by subtracting an output signal of an adaptive filter from a local-end signal; determining whether the first cross-correlation is above a pre-determined threshold; relocating the adaptive filter by a few samples if the determining determines that the first cross-correlation is above a pre-determined threshold; calculating a first improvement indicator parameter, wherein the first improvement indicator parameter is calculated after the relocating the adaptive filter by the few samples; determining whether the first improvement indicator parameter indicates a performance improvement by the adaptive filter after the relocating the adaptive filter by the few samples; calculating a gain based on the local-end signal and the error signal if the determining does not determine the performance improvement; and multiplying the adaptive filter by the gain.

28 Claims, 4 Drawing Sheets

FAST ECHO CANCELLER RECONVERGENCE AFTER TDM SLIPS AND ECHO LEVEL CHANGES

BACKGROUND OF THE INVENTION

1. Field of the Invention

The present invention relates generally to echo canceller systems in communication networks. More particularly, the present invention relates to methods and systems for fast reconvergence of echo cancellers after TDM slips and echo level changes.

2. Background Art

Subscribers use speech quality as the benchmark for assessing the overall quality of a telephone network. A key technology to provide a high quality speech is echo cancellation. Echo canceller performance in a telephone network, either a TDM or packet telephony network, has a substantial impact on the overall voice quality. An effective removal of hybrid and acoustic echo inherent in telephone networks is a key to maintaining and improving perceived voice quality during a call.

Echoes occur in telephone networks due to impedance mismatches of network elements and acoustical coupling within telephone handsets. Hybrid echo is the primary source of echo generated from the public-switched telephone network (PSTN). As shown in FIG. 1, hybrid echo 110 is created by a hybrid, which converts a four-wire physical interface into a two-wire physical interface. The hybrid reflects electrical energy back to the speaker from the four-wire physical interface. Acoustic echo, on the other hand, is generated by analog and digital telephones, with the degree of echo related to the type and quality of such telephones. As shown in FIG. 1, acoustic echo 120 is created by a voice coupling between the earpiece and microphone in the telephones, where sound from the speaker is picked by the microphone, for example, by bouncing off the walls, windows, and the like. The result of this reflection is the creation of multi-path echo, which would be heard by the speaker unless eliminated.

As shown in FIG. 1, in modern telephone networks, echo canceller 140 is typically positioned between hybrid 130 and network 150. Generally speaking, echo cancellation process involves two steps. First, as the call is set up, echo canceller 140 employs a digital adaptive filter to adapt to the far-end signal and create a model based on the far-end signal before passing through hybrid 130. After the local-end signal, including near-end signal and/or echo signal, passes through hybrid 130, echo canceller 140 subtracts the far-end model from the local-end signal to cancel hybrid echo and generate an error signal. Although this echo cancellation process removes a substantial amount of the echo, non-linear components of the echo may still remain. To cancel non-linear components of the echo, the second step of the echo cancellation process utilizes a non-linear processor (NLP) to eliminate the remaining or residual echo by attenuating the signal below the noise floor.

Due to changes in the echo path, echo cancellers may restart the adaptation process to readjust the echo cancellation parameters. Echo path changes may occur due to a variety of reasons such as when there is a clock slip in the Time Division Multiplexed (TDM) bus that carries the coded speech, such as G.711 coded speech, or when there is a change in the echo level. As a result, conventional echo cancellers restart the adaptation process when there is a clock slip in the TDM bus and/or when there is a change in the echo level. Such restart process is known to be time consuming and even more, quite undesirable, because while the adaptive filter goes through the re-adaptation process, the echo signal is not being cancelled effectively.

Accordingly, there is a need in the art for echo canceller systems that can converge or adapt quickly when there is a clock slip in the TDM bus and/or when there is a change in the echo level, without restarting the adaptation process.

SUMMARY OF THE INVENTION

The present invention is directed to methods and systems for fast reconvergence of echo cancellers after TDM slips and echo level changes. According to one aspect of the present invention, there is provided a method of adjusting an echo canceller, where the method comprises obtaining a first cross-correlation between a far-end signal and an error signal, wherein the error signal is generated by subtracting an output signal of an adaptive filter from a local-end signal; determining whether the first cross-correlation is above a pre-determined threshold; relocating the adaptive filter by a few samples if the determining determines that the first cross-correlation is above a pre-determined threshold; calculating a first improvement indicator parameter, wherein the first improvement indicator parameter is calculated after the relocating the adaptive filter by the few samples; and determining whether the first improvement indicator parameter indicates a performance improvement by the adaptive filter after relocating the adaptive filter by the few samples. In one aspect, the relocating relocates the adaptive filter forward by the few samples, and in another aspect, the relocating relocates the adaptive filter backward by the few samples. In another aspect, the echo canceller enables aggressive adaptation of the adaptive filter if the performance of the adaptive filter does not improve.

In one aspect, the echo canceller calculates a first echo return loss enhancement (ERLE), and wherein the improvement indicator parameter is a second ERLE, the echo canceller compares the first ERLE with the second ERLE to determine the performance improvement. In another aspect, the first improvement indicator parameter is a second cross-correlation between the far-end signal and the error signal, and the echo canceller compares the first cross-correlation with the second cross-correlation to determine the performance improvement.

In a separate aspect, a method of adjusting an echo canceller comprises obtaining a first cross-correlation between a far-end signal and an error signal, wherein the error signal is generated by subtracting an output signal of an adaptive filter from a local-end signal; determining whether the first cross-correlation is above a pre-determined threshold; calculating a gain based on the local-end signal and the error signal if the determining determines that the first cross-correlation is above the pre-determined threshold; multiplying the adaptive filter by the gain; calculating a first improvement indicator parameter, wherein the first improvement indicator parameter is calculated after the multiplying the adaptive filter by the gain; and determining whether the first improvement indicator parameter indicates a performance improvement by the adaptive filter after multiplying the adaptive filter by the gain.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
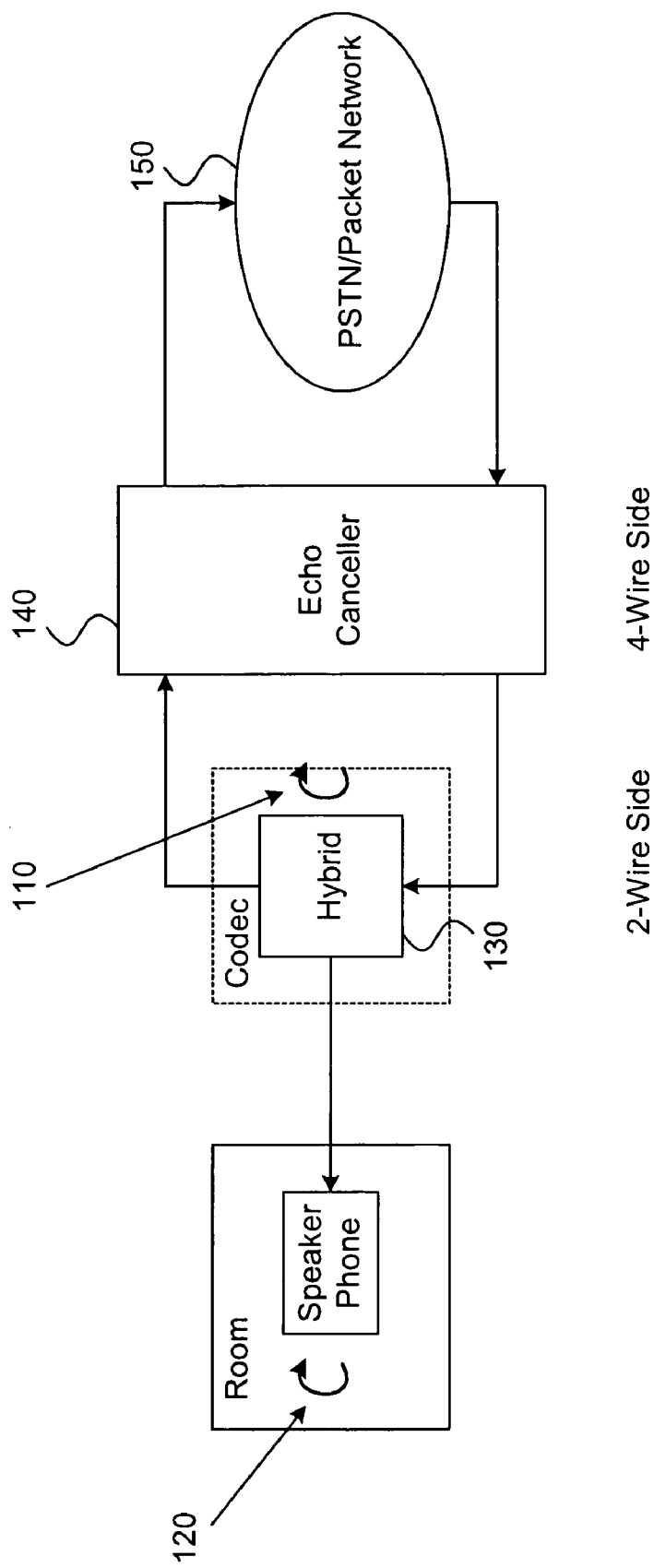
FIG. 1 illustrates a block diagram of a conventional communication system showing a placement of an echo canceller in an access network.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
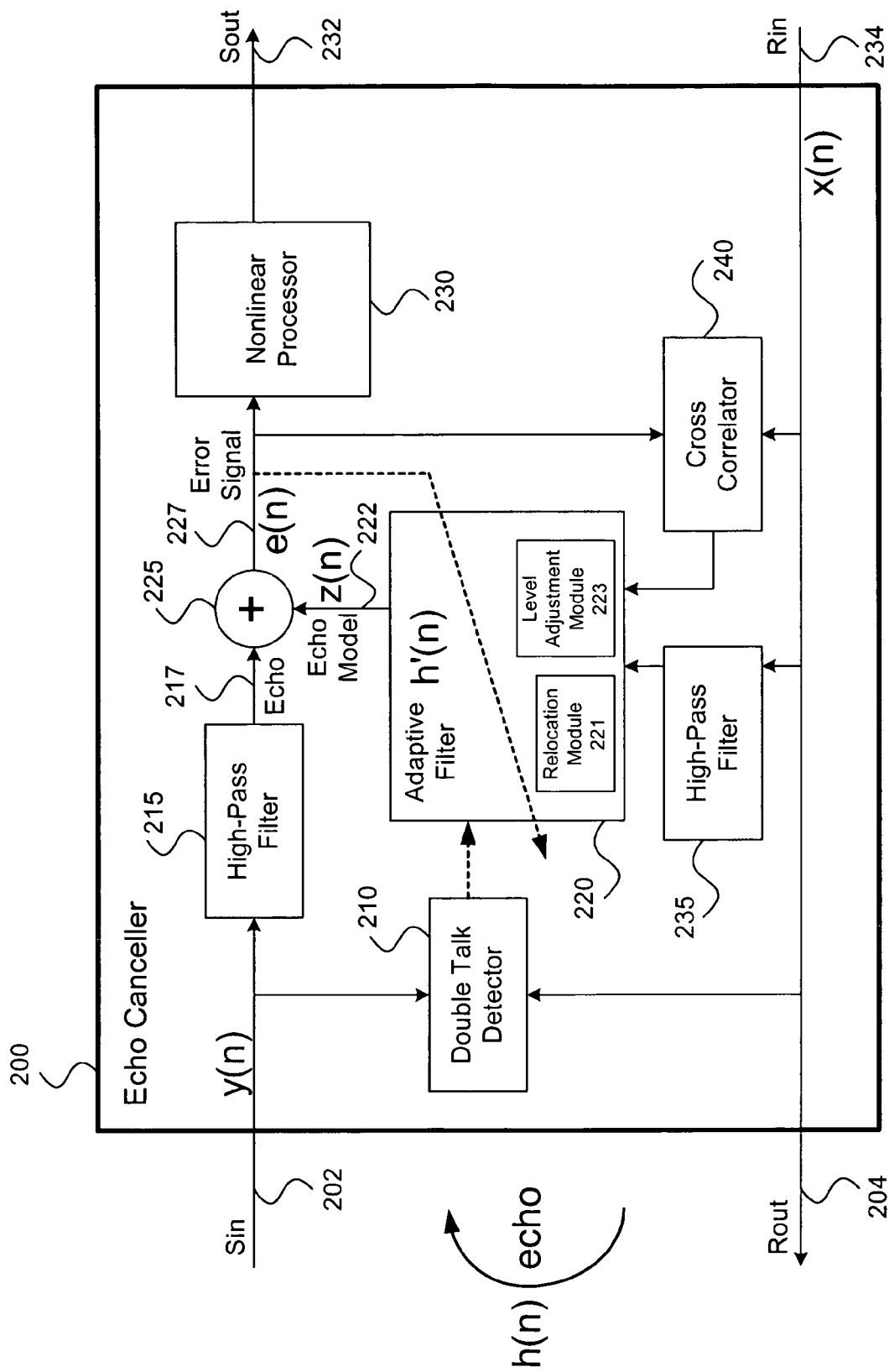
FIG. 2 illustrates a block diagram of an echo canceller, according to one embodiment of the present invention.

FIG. 2 illustrates a block diagram of echo canceller 200, according to one embodiment of the present invention. As shown, echo canceller 200 includes double talk detector 210, high-pass filters 215 and 235, adaptive filter 220, error estimator 225, nonlinear processor 230 and cross-correlator 240. During its operation, echo canceller 200 receives Rin signal 234 from the far end, which is fed to high-pass filter 235, cross-correlator 240 and double talk detector 210, and is passed through to the hybrid, e.g. see hybrid 130 of FIG. 1, as Rout signal 204 to the near end. As discussed above, the hybrid causes Rout signal 204 to be reflected as Sin signal 202 from the near end, which is fed to high pass filter 215 and double talk detector 210.

High-pass filters 215 and 235, which are placed at the receiving side and transmitting side of echo canceller 200, respectively, remove DC component from Rin signal 234 and Sin signal 202, respectively.

Double talk detector 210 controls the behavior of adaptive filter 220 during periods when Sin signal 202 from the near end reaches a certain level. Because echo canceller 200 is utilized to cancel an echo of Rin signal 234 from the far end, presence of speech signal from the near end would cause adaptive filter 220 to converge on a combination of near end speech signal and Rin signal 234, which will lead to an inaccurate echo path model, i.e. incorrect adaptive filter 220 coefficients. Therefore, in order to cancel the echo signal, adaptive filter 220 should not train in the presence of the near end speech signal. To this end, echo canceller 200 must analyze the incoming signal and determine whether it is solely an echo signal of Rin signal 234 or also contains the speech of a near end talker. By convention, if two people are talking over a communication network or system, one person is referred to as the "near talker," while the other person is referred to as the "far talker." The combination of speech signals from the near end talker and the far end talker is referred to as "double talk."

To determine whether Sin signal 202 contains double talk, double talk detector 210 estimates and compares the characteristics of Rin signal 234 and Sin signal 202. A primary purpose of double talk detector is to prevent adaptive filter 220 from adaptation when double talk is detected or to adjust the degree of adaptation based on confidence level of double talk detection, which is described in U.S. Pat. No. 6,804,203, entitled "Double Talk Detector for Echo Cancellation in a Speech Communication System", which is hereby incorporated by reference in its entirety.

Echo canceller 200 utilizes adaptive filter 220 to model the echo path and its delay. In one embodiment, adaptive filter 220 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve performance of echo canceller 200, it may be desirable to vary the adaptation rate at which the transversal filter tap coefficients of adaptive filter 220 are adjusted. For instance, if double talk detector 210 denotes a high confidence level that the incoming signal is an echo signal, it is preferable for adaptive filter 220 to adapt quickly. On the other hand, if double talk detector 210 denotes a low confidence level that the incoming signal is an echo signal, i.e. it may include double talk, it is preferable to decline to adapt at all or to adapt very slowly. If there is an error in determining whether Sin signal 202 is an echo signal, a fast adaptation of adaptive filter 220 causes rapid divergence and a failure to eliminate the echo signal.

In one embodiment, adaptive filter 220 may be represented by function h(n), which is originally reset, i.e. h(n)=0. As Rin signal 234 is received by adaptive filter 220, function h(n) grows to form an echo path model based on Rin signal 234 from the far end. In one embodiment, echo canceller 200 can be a SPARSE echo canceller, which employs adaptive filter algorithms with a dynamically positioned window to cover a desired echo tail length. In such embodiment, echo canceller 200 uses a sliding window, e.g. a 24 ms window, covering an echo path delay, e.g. a 128 ms delay. To properly cancel the echo, echo canceller 200 must determine pure delay or bulk delay, which is indicative of the location of the echo signal segment or window within the 128 ms echo path delay. A bulk delay parameter stores the location of bulk delay, which is determined by echo canceller 200 based on an analysis of the echo path delay. In another embodiment, echo canceller 200 can be a non-SPARSE echo canceller, which applies a full-length adaptive filter to cover a specific echo tail length. In such embodiment, echo canceller 200 uses full-window adaptive filter algorithms to cover the echo path delay, e.g. a 24 ms delay.

As shown in FIG. 2, adaptive filter 220 produces echo model signal 222 based on Rin signal 234 from the far end. Error estimator 225 receives echo signal 217, which is the output of high-pass filter 215, and subtracts echo model signal 222 from echo signal 217 to generate residual echo signal or error signal 227. Adaptive filter 220 also receives error signal 227 and updates its coefficients based on error signal 227.

It is known that the echo path includes nonlinear components that cannot be removed by adaptive filter 220 and, thus, after subtraction of echo model signal 222 from echo signal 217, there remains residual echo, which must be eliminated by nonlinear processor (NLP) 230. As shown NLP 230 receives residual echo signal or error signal 227 from error estimator 225 and generates Sout 220 for transmission to far end. If error signal 227 is below a certain level, NLP 230 replaces the residual echo with either comfort noise if the comfort noise option is enabled, or with silence if the comfort noise option is disabled.

With continued reference to FIG. 2, echo canceller 200 includes cross-correlator 240, which is utilized by echo canceller 200 to calculate a cross-correlation (C) between far-end signal Rin 234, represented by function x(n), and error signal 227, represented by function e(n). In one embodiment, cross-correlator 240 may calculate the cross-correlation (C) between far-end signal Rin 234 and error signal 227 using the following equation:

$$C = \frac{\left|\sum_{0}^{N-1} e(n) \cdot x(n-k)\right|}{\sqrt{\sum_{0}^{N-1} e^2(n) \sum_{0}^{N-1} x^2(n-k)}} \text{ where, } 0 < C < 1$$

Equation No. 1

The cross-correlation (C) is indicative of how well echo signal 217 is being cancelled by adaptive filter 220. For example, in one embodiment, if cross-correlator 240 determines that C is above a pre-determined threshold, e.g. 0.7, cross-correlator 240 signals adaptive filter 220 that echo signal 217 is not being cancelled adequately. It should be noted that in some embodiments, cross-correlator 240 may be incorporated within adaptive filter 220.

Adaptive filter 220 includes relocation module 221, which is capable of relocating adaptive filter 220 by a few samples, e.g. 1-20 samples, backward and forward. As explained above, due to a clock slip in the TDM bus, echo canceller 220 may degrade in performance. In conventional echo cancellers, when a degradation in echo canceller performance occurs, adaptive filter 220 is reset or initialized, so that adaptive filter can adapt to a change in the echo path. However, in one embodiment of the present application, if such degradation in echo canceller 220 performance is detected, relocation module 221 relocates adaptive filter 220 by a few samples forward and determines if echo canceller 220 performance has improved by, for example, calculating the cross-correlation (C) between far-end signal Rin 234 and error signal 227. If echo cancellation 220 does not improve in performance, relocation module 221 relocates adaptive filter 220 by a few samples backward from its original location and determines if echo canceller 220 performance has improved by, for example, calculating the cross-correlation (C) between far-end signal Rin 234 and error signal 227. In one embodiment, if it is determined that echo canceller 220 performance is still not acceptable after the relocation, aggressive adaptation of adaptive filter 220 is enabled with or without resetting adaptive filter 220.

However, in another embodiment, if adaptive filter relocation does not achieve a reasonable echo canceller 220 performance, level adjustment module 223 of adaptive filter 220 may calculate a gain based on local-end signal Sin 202, represented by function y(n), and error signal 227, represented by function e(n). The gain should be calculated when local-end signal Sin 202 represents pure echo signal, i.e. no near-end signal. In one embodiment, the gain may be calculated using the following equation:

$$\beta = \sqrt{\frac{\sum_{0}^{N-1} y^2(n)}{\sum_{0}^{N-1} z^2(n)}}$$

Equation No. 2

Next, level adjustment module 223 multiplies adaptive filter 220, represented by function h'(n), by the gain ($\beta$), and it is determined if echo canceller 220 performance has improved by, for example, calculating the cross-correlation (C) between far-end signal Rin 234 and error signal 227. If it is determined that echo canceller 220 performance is still not acceptable after the level adjustment, aggressive adaptation of adaptive filter 220 is enabled with or without resetting adaptive filter 220. As explained above, due to a change in the echo level, echo canceller 220 may degrade in performance. In conventional echo cancellers, when a degradation in echo canceller performance occurs, adaptive filter 220 is reset or initialized, so that adaptive filter can adapt to a change in the echo path. However, according to one embodiment of the present invention, a level adjustment, as described above, is applied to adaptive filter 220.

According to the embodiments of the present invention, echo canceller 220, may adapt very quickly to echo path changes resulting from a clock slip in the TDM bus and/or echo level changes, whereas conventional echo cancellers require echo canceller initialization. It should be noted that the level adjustment and the adaptive filter relocation algorithms of the present invention may be applied in any order or one may be applied without the other.

Figure 3:
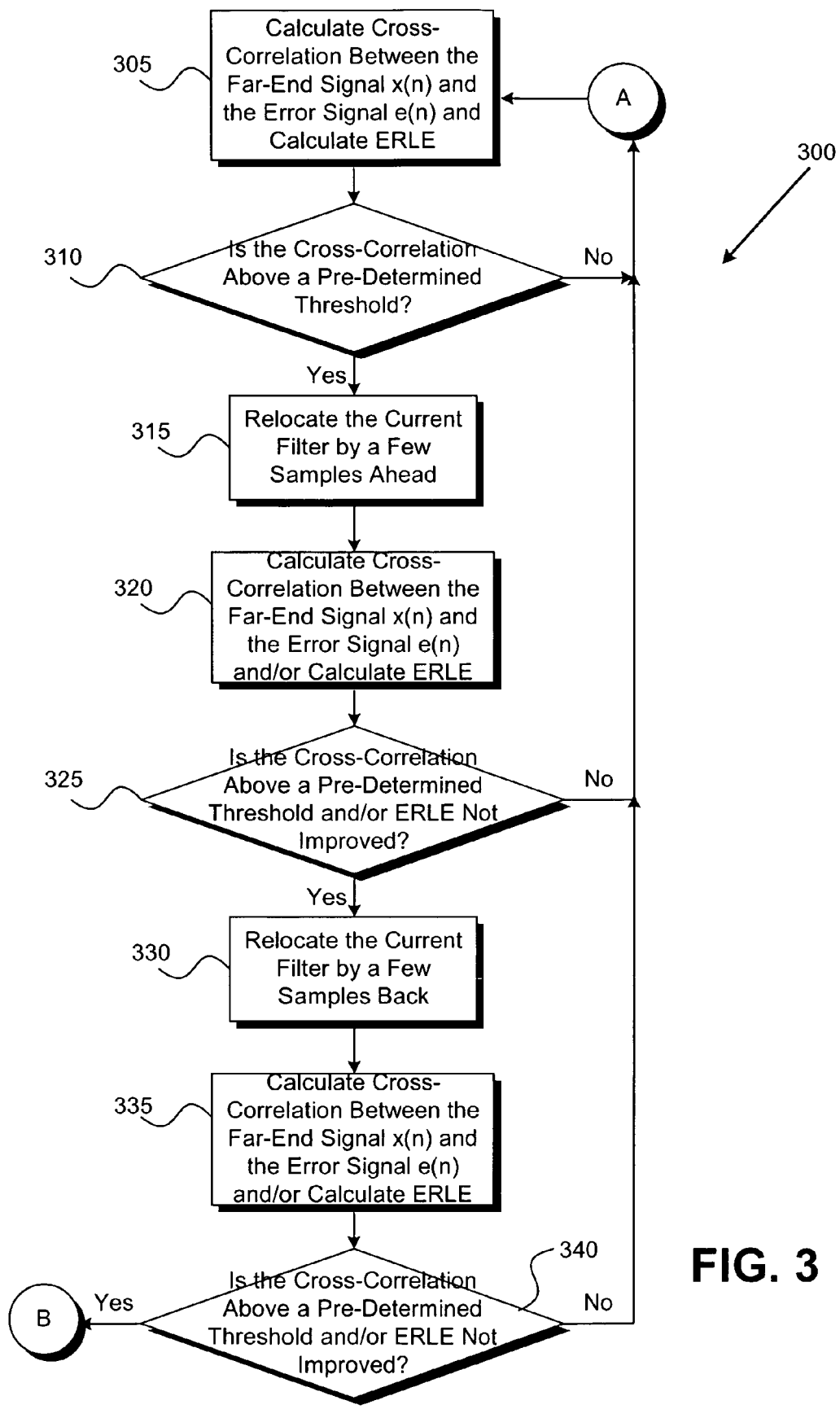
FIG. 3 illustrates a flow diagram of an echo cancellation method for use by the echo canceller of FIG. 2.
Figures 1, 3:
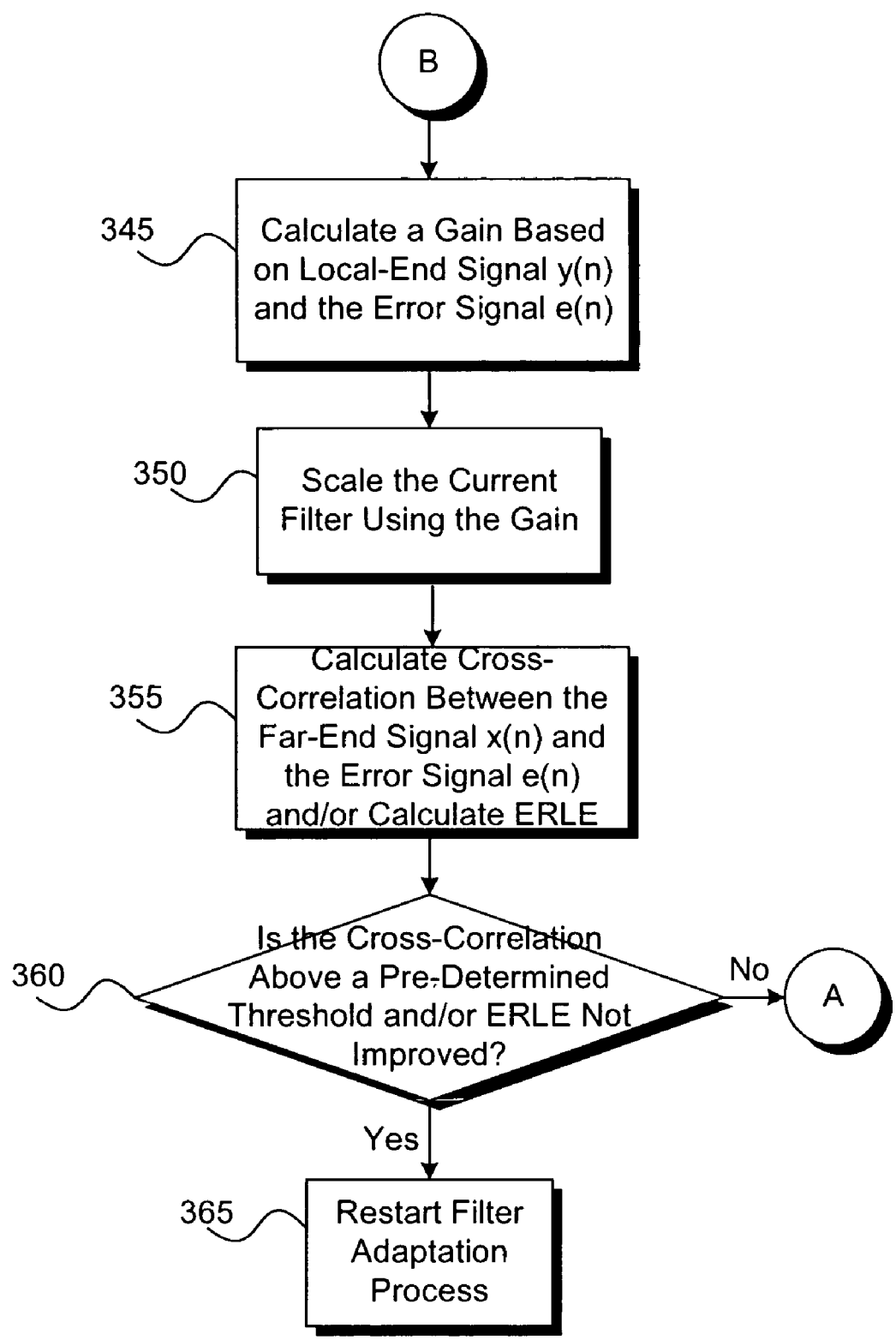

Turning to FIG. 3, it illustrates a flow diagram of echo cancellation method 300 for use by echo canceller 200 of FIG. 2. At step 305, cross-correlator 240 calculates the cross-correlation between far end signal Rin 23, represented by function x(n), and error signal 227, represented by function e(n). In one embodiment, the cross-correlation (C) is calculated according to the equation no. 1, shown above. Further, in some embodiments, at step 305, adaptive filter 220 calculates the echo return loss enhancement (ERLE), which can be described as the energy difference between local-end signal Sin and error signal 227. Next, at step 310, it is determined whether the cross-correlation (C) is above a pre-determined threshold. For example, in one embodiment, the pre-determined threshold can be about 0.7. If the cross-correlation (C) is not above the pre-determined threshold, it means that adaptive filter 220 is a reasonable representative of the echo signal, and echo cancellation method 300 moves back to step 305. On the other hand, if the cross-correlation (C) is above the pre-determined threshold, it means that adaptive filter 220 is not a reasonable representative of the echo signal, and that echo signal is not being cancelled properly by echo canceller 200. In such event, echo cancellation method 300 moves to step 315, where adaptive filter 220, which is represented by function h'(n) is relocated a few samples ahead or forward. Next, at step 320, the cross-correlation is calculated, as described above in step 305. In one embodiment, adaptive filter 220 may calculate the ERLE in addition to or in place of the cross-correlation. For example, to reduce complexity, in some embodiments, adaptive filter 220 calculates ERLE only at step 320. At step 325, if the cross-correlation is calculated at step 320, it is determined whether the relocation of adaptive filter 220 forward by a few samples has caused the cross-correlation (C) to move below the pre-determined threshold, by calculating the cross-correlation (C), as described in step 310. If so, echo cancellation method 300 moves back to step 305, otherwise echo cancellation method 300 moves to step 330. In embodiments where the ERLE is calculated, at step 325, it is determined whether the performance of adaptive filter 220 has improved by comparing the new ERLE calculated at step 320 with the previous ERLE calculated at step 305. For example, if the comparison indicates about 3 dB or more improvement, echo cancellation method 300 moves back to step 305, otherwise echo cancellation method 300 moves to step 330. At step 330, adaptive filter 220, which is represented by function h'(n) is relocated a few samples backward from its original location prior to step 315. Again, at step 335, in some embodiments, the cross-correlation is calculated, as described above in step 305. In such embodiments, at step 340, it is determined whether the relocation of adaptive filter 220 backward by a few samples has caused the cross-correlation (C) to move below the pre-determined threshold. If so, echo cancellation method 300 moves back to step 305, otherwise echo cancellation method 300 moves to step 345. In embodiments where the ERLE is calculated, at step 340, it is determined whether the performance of adaptive filter 220 has improved by comparing the new ERLE calculated at step 335 with the previous ERLE calculated at step 305, and if so, echo cancellation method 300 moves back to step 305, otherwise echo cancellation method 300 moves to step 345. It should be noted that in some embodiments, echo cancellation method 300 may move to step 365 rather than step 345, where aggressive adaptation of adaptive filter 220 is enabled with or without resetting adaptive filter 220. Further, in some embodiments, the backward relocation may occur before the forward relocation, or one without the other. As discussed above in conjunction with FIG. 2, steps 305-340 can quickly relocate adaptive filter 220, which may have been displaced due to a clock slip in the TDM bus, without a need for aggressive adaptation of adaptive filter 220.

Turning back to FIG. 3, at step 345, echo cancellation method 300 calculates a gain based on local-end signal Sin 202, represented by function y(n), and error signal 227, represented by function e(n). The gain should be calculated when local-end signal Sin 202 represents pure echo signal, i.e. no near-end signal. In one embodiment, the gain may be calculated using equation no. 2, shown above. Next, at step 350, adaptive filter 220, represented by function h'(n), is multiplied by the gain (β) to perform a level adjustment. At step 355, in some embodiments, the cross-correlation is calculated, as described above in step 305. In such embodiments, at step 360, it is determined whether the level adjustment of adaptive filter 220 has caused the cross-correlation (C) to move below the pre-determined threshold. If so, echo cancellation method 300 moves back to step 305, otherwise echo cancellation method 300 moves to step 365, where aggressive adaptation of adaptive filter 220 is enabled with or without resetting adaptive filter 220. In embodiments where the ERLE is calculated, at step 360, it is determined whether the performance of adaptive filter 220 has improved by comparing the new ERLE calculated at step 355 with the previous ERLE calculated at step 305, and if so, echo cancellation method 300 moves back to step 305, otherwise echo cancellation method 300 moves to step 365. As discussed above in conjunction with FIG. 2, steps 345-360 can quickly adjust adaptive filter 220, which may have been adversely affected due to a level change, without enabling aggressive adaptation adaptive filter 220. It should be noted that in some embodiments, echo cancellation method 300 may perform steps 345-355 prior to steps 305-340, and yet, in other embodiments, steps 345-355 and steps 305-340 may be performed without the other.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of adjusting an echo canceller, said method comprising:
    obtaining a first cross-correlation between a far-end signal and an error signal, wherein said error signal is generated by subtracting an output signal of an adaptive filter from a local-end signal including an echo signal, wherein said adaptive filter utilizes said far-end signal to generate the output signal, and wherein said first cross-correlation is indicative of adequacy of cancellation of said echo signal;
    determining whether said first cross-correlation is above a pro-determined threshold;
    relocating said adaptive filter by a few samples if said determining determines that said first cross-correlation is above said pre-determined threshold indicative of said echo signal not being cancelled adequately;
    calculating a first improvement indicator parameter, wherein said first improvement indicator parameter is calculated after said relocating said adaptive filter by said few samples; and
    determining whether said first improvement indicator parameter indicates a performance improvement by said adaptive filter after said relocating said adaptive filter by said few samples;
    wherein said first cross-correlation is defined by:

$$C = \frac{\left| \sum_{0}^{N-1} e(n) \cdot x(n-k) \right|}{\sqrt{\sum_{0}^{N-1} e^2(n) \sum_{0}^{N-1} x^2(n-k)}} \quad \text{where, } 0 < C < 1$$

wherein C designates said first cross-correlation, x(n) designates said far-end signal, e(n) designates said error signal.

2. The method of claim 1, wherein said obtaining further includes calculating a first echo return loss enhancement (ERLE), and wherein said improvement indicator parameter is a second ERLE, and wherein said determining includes comparing said first ERLE with said second ERLE.

3. The method of claim 1, wherein said first improvement indicator parameter is a second cross-correlation between said far-end signal and said error signal, and wherein said determining includes comparing said first cross-correlation with said second cross-correlation.

4. The method of claim 1 further comprising:
    enabling aggressive adaption on of said adaptive filter if said determining does not determine said performance improvement.

5. The method of claim 1, wherein said relocating relocates said adaptive filter forward by said few samples.

6. The method of claim 3 further comprising:
relocating said adaptive filter by a few samples backward if said determining does not determine said performance improvement.

7. The method of claim 6 further comprising:
calculating a second improvement indicator parameter, wherein said second improvement indicator parameter is calculated after said relocating said adaptive filter backward by said few samples; and
determining whether said second improvement indicator parameter indicates said performance improvement by said adaptive filter after said relocating said adaptive filter backward by said few samples.

8. The method of claim 7 further comprising:
enabling aggressive adaptation of said adaptive filter if said determining does not determine said performance improvement by said adaptive filter after said relocating said adaptive filter backward by said few samples.

9. The method of claim 7 further comprising:
calculating a gain based on said local-end signal and said error signal if said determining does not determine said performance improvement by said adaptive filter after said relocating said adaptive filter backward by said few samples; and
multiplying said adaptive filter by said gain.

10. The method of claim 9 further comprising:
calculating a third improvement indicator parameter, wherein said third improvement indicator parameter is calculated after said multiplying said adaptive filter by said gain;
determining whether said third improvement indicator parameter indicates said performance improvement by said adaptive filter after said multiplying said adaptive filter by said gain; and enabling aggressive adaptation of said adaptive filter if said determining does not determine said performance improvement by said adaptive filter after said multiplying said adaptive filter by said gain.

11. The method of claim 1, wherein said relocating relocates said adaptive filter backward by said few samples.

12. The method of claim 1 further comprising:
calculating a gain based on said local-end signal and said error signal if said determining does not determine said performance improvement; and
multiplying said adaptive filter by said gain.

13. The method of claim 12 further comprising:
calculating a second improvement indicator parameter, wherein said second improvement indicator parameter is calculated after said multiplying said adaptive filter by said gain;
determining whether said second improvement indicator parameter indicates said performance improvement by said adaptive filter after said multiplying said adaptive filter by said gain; and
enabling aggressive adaptation of said adaptive filter if said determining does not determine said performance improvement by said adaptive filter after said multiplying said adaptive filter by said gain.

14. A method of adjusting an echo canceller, said method comprising:
obtaining a first cross-correlation between a far-end signal and an error signal, wherein said error signal is generated by subtracting an output signal of an adaptive filter from a local-end signal including an echo signal, wherein said adaptive filter utilizes said far-end signal to generate the output signal, and wherein said first cross-correlation is indicative of adequacy of cancellation of said echo signal;
determining whether said first cross-correlation is above a pre-determined threshold;
calculating a gain based on said local-end signal and said error signal if said determining determines that said first cross-correlation is above said pre-determined threshold indicative of said echo signal not being cancelled adequately;
multiplying said adaptive filter by said gain;
calculating a first improvement indicator parameter, wherein said first improvement indicator parameter is calculated after said multiplying said adaptive filter by said gain; and
determining whether said first improvement indicator parameter indicates a performance improvement by said adaptive filter after said multiplying said adaptive filter by said gain;
wherein said first cross-correlation is defined by:

$$C = \frac{\left|\sum_{0}^{N-1} e(n) \cdot x(n-k)\right|}{\sqrt{\sum_{0}^{N-1} e^2(n) \sum_{0}^{N-1} x^2(n-k)}} \text{ where, } 0 < C < 1$$

wherein C designates said first cross-correlation, x(n) designates said far-end signal, e(n) designates said error signal.

15. The method of claim 14, wherein said obtaining further includes calculating a first echo return loss enhancement (ERLE), and wherein said improvement indicator parameter is a second ERLE, and wherein said determining includes comparing said first ERLE with said second ERLE.

16. The method of claim 14, wherein said first improvement indicator parameter is a second cross-correlation between said far-end signal and said error signal, and wherein said determining includes comparing said first cross-correlation with said second cross-correlation.

17. The method of claim 14 further comprising:
enabling aggressive adaptation of said adaptive filter if said determining does not determine said performance improvement.

18. The method of claim 14 further comprising:
relocating said adaptive filter by a few samples if said determining does not determine said performance improvement.

19. The method of claim 18, wherein said relocating relocates said adaptive filter forward by said few samples.

20. The method of claim 18, wherein said relocating relocates said adaptive filter backward by said few samples.

21. An echo canceller comprising:
a cross-correlator configured to obtain a first cross-correlation between a far-end signal and an error signal, wherein said error signal is generated by subtracting an output signal of an adaptive filter from a local-end signal including an echo signal, wherein said adaptive filter utilizes said far-end signal to generate the output signal, and wherein said first cross-correlation is indicative of adequacy of cancellation of said echo signal;
an adaptive filter configured to determine whether said first cross-correlation is above a pre-determined threshold, said adaptive filter having a relocation module configured to relocate said adaptive filter by a few samples if said adaptive filter determines that said first cross-correlation is above said pre-determined threshold indicative of said echo signal not being cancelled adequately;

wherein said echo canceller is configured to calculate a first improvement indicator parameter, wherein said first improvement indicator parameter is calculated after said relocating said adaptive filter by said few samples, and wherein said echo canceller is configured to determine whether said first improvement indicator parameter indicates a performance improvement by said adaptive filter after said relocating said adaptive filter by said few samples, and wherein said first cross-correlation is defined by:

$$C = \frac{\left|\sum_{0}^{N-1} e(n) \cdot x(n-k)\right|}{\sqrt{\sum_{0}^{N-1} e^2(n) \sum_{0}^{N-1} x^2(n-k)}} \text{ where, } 0 < C < 1$$

wherein C designates said first cross-correlation, x(n) designates said far-end signal, e(n) designates said error signal.

22. The echo canceller of claim 21, wherein said echo canceller obtains a first echo return loss enhancement (ERLE), and wherein said improvement indicator parameter is a second ERLE, and wherein said echo canceller compares said first ERLE with said second ERLE to determine said performance improvement.

23. The echo canceller of claim 21, wherein said first improvement indicator parameter is a second cross-correlation between said far-end signal and said error signal, and wherein said echo canceller compares said first cross-correlation with said second cross-correlation to determine said performance improvement.

24. The echo canceller of claim 21, wherein said relocation module relocates said adaptive filter forward by said few samples.

25. The echo canceller of claim 21, wherein said relocation module relocates said adaptive filter backward by said few samples.

26. The echo canceller of claim 21, wherein an aggressive adaptation of said adaptive filter is enabled if said echo canceller does not determine said performance improvement by said adaptive filter.

27. The echo canceller of claim 21 further comprising a level adjustment module configured to calculate a gain based on said local-end signal and said error signal if said echo canceller does not determine said performance improvement by said adaptive filter, and further configured to multiply said adaptive filter by said gain.

28. The echo canceller of claim 27, wherein said echo canceller calculates a second improvement indicator parameter, wherein said second improvement indicator parameter is calculated after said level adjustment module multiplies said adaptive filter by said gain, wherein said echo canceller is configured to determine whether said second improvement indicator parameter indicates said performance improvement by said adaptive filter after said level adjustment module multiplies said adaptive filter by said gain, and wherein an aggressive adaptation of said adaptive filter is enabled if said echo canceller does not determine said performance improvement by said adaptive filter after said level adjustment module multiplies said adaptive filter by said gain.

* * * * *

UNITED STATES PATENT AND TRADEMARK OFFICE
CERTIFICATE OF CORRECTION

| | | |
|---|---|---|
| PATENT NO. | : 7,711,108 B2 | Page 1 of 1 |
| APPLICATION NO. | : 11/072476 | |
| DATED | : May 4, 2010 | |
| INVENTOR(S) | : Su et al. | |

It is certified that error appears in the above-identified patent and that said Letters Patent is hereby corrected as shown below:

In the claims, column 8, line 26, "pro-determined" should be changed to --pre-determined--.

In the claims, column 8, line 65, "adaption" should be changed to --adaptation--.

Signed and Sealed this

Nineteenth Day of October, 2010

David J. Kappos
*Director of the United States Patent and Trademark Office*